(12) United States Patent
Yamaguchi

(10) Patent No.: US 8,542,467 B2
(45) Date of Patent: Sep. 24, 2013

(54) SWITCHING DEVICE

(75) Inventor: Nobuhisa Yamaguchi, Toyokawa (JP)

(73) Assignee: Denso Corporation, Kariya (JP)

( * ) Notice: Subject to any disclaimer, the term of this patent is extended or adjusted under 35 U.S.C. 154(b) by 344 days.

(21) Appl. No.: 13/014,004

(22) Filed: Jan. 26, 2011

(65) Prior Publication Data

US 2011/0181993 A1 Jul. 28, 2011

(30) Foreign Application Priority Data

Jan. 26, 2010 (JP) .................................. 2010-14568
Nov. 24, 2010 (JP) ................................ 2010-261114

(51) Int. Cl.
*H02H 7/00* (2006.01)
(52) U.S. Cl.
USPC .......................................................... 361/18
(58) Field of Classification Search
USPC .......................................................... 361/18
See application file for complete search history.

(56) References Cited

U.S. PATENT DOCUMENTS

| | | | |
|---|---|---|---|
| 5,077,651 A | | 12/1991 | Kobayashi et al. |
| 5,566,060 A | * | 10/1996 | Shimer et al. ................. 363/65 |
| 5,610,452 A | * | 3/1997 | Shimer et al. ................. 307/89 |
| 5,875,103 A | * | 2/1999 | Bhagwat et al. .............. 363/17 |
| 6,204,717 B1 | * | 3/2001 | Nagasu et al. ................ 327/318 |
| 6,714,426 B1 | * | 3/2004 | Guo et al. ..................... 363/25 |
| 2009/0002956 A1 | * | 1/2009 | Suwa et al. .................... 361/728 |
| 2010/0328975 A1 | * | 12/2010 | Hibino et al. ................. 363/126 |
| 2011/0181993 A1 | * | 7/2011 | Yamaguchi .................... 361/111 |
| 2011/0280048 A1 | * | 11/2011 | Fujiyoshi et al. ............. 363/21.04 |
| 2012/0106220 A1 | * | 5/2012 | Yamaguchi et al. .......... 363/131 |

FOREIGN PATENT DOCUMENTS

| | | |
|---|---|---|
| JP | 8-149795 | 6/1996 |
| JP | 10-262371 | 9/1998 |
| JP | 3519227 | 2/2004 |

OTHER PUBLICATIONS

Murai et al., "Reduction of Circuit Inductance in Power Modules for Electric Vehicles", *Yamaha Motor Technical Review*, Dec. 17, 2003, 7 pages.

* cited by examiner

*Primary Examiner* — Ronald W Leja
(74) *Attorney, Agent, or Firm* — Nixon & Vanderhye PC

(57) ABSTRACT

A switching device includes a plurality of semiconductor switching elements coupled in series, a smoothing capacitor, and snubber circuit. Each of the semiconductor switching elements includes a free wheel diode. The smoothing capacitor is coupled in parallel with a direct current power source and the semiconductor switching elements. The smoothing capacitor smoothes an output of the direct current power source and supplies the smoothed output to the semiconductor switching elements. The snubber circuit is coupled between a first connecting point and a second connecting point in parallel with the semiconductor switching elements. An inductance of a first channel provided from the first connecting point to the second connecting point through the smoothing capacitor is equal to or more than 10 times as large as an inductance of a second channel including the semiconductor switching elements and the snubber circuit.

13 Claims, 16 Drawing Sheets

US 8,542,467 B2

SWITCHING DEVICE

CROSS REFERENCE TO RELATED APPLICATIONS

The present application is based on and claims priority to Japanese Patent Applications No. 2010-14568 filed on Jan. 26, 2010 and No. 2010-261114 filed on Nov. 24, 2010, the contents of which are incorporated in their entirety herein by reference.

BACKGROUND OF THE INVENTION

1. Field of the Invention

The present invention relates to a switching device including a plurality of semiconductor switching elements coupled in series.

2. Description of the Related Art

Japanese Patent No. 2,754,411 (corresponding to U.S. Pat. No. 5,077,651) discloses a power converter as a switching device that includes a plurality of semiconductor elements coupled in series. As shown in FIG. 17, the power converter includes two transistors Tr1 and Tr2 coupled in series. A collector of the transistor Tr1 is coupled with a positive terminal of a direct current power source VDC. An emitter of the transistor Tr2 is coupled with a negative terminal of the direct current power source VDC. The power converter includes a snubber circuit. The snubber circuit restricts a surge voltage, which is generated due to a stray inductance L1 of a wiring when the transistors Tr1 and Tr2 are deactivated and is applied to the transistors Tr1 and Tr2. The snubber circuit includes zener diodes ZD1 and ZD2, charge-discharge snubber capacitors C1 and C2, and a clump snubber capacitor C3. The zener diode ZD1 and the charge-discharge snubber capacitor C1 are coupled in series, and the zener diode ZD1 and the charge-discharge snubber capacitor C1 are coupled in parallel with the transistor Tr1. The zener diode ZD2 and the charge-discharge snubber capacitor C2 are coupled in series, and the zener diode ZD2 and the charge-discharge snubber capacitor C2 are coupled in parallel with the transistor Tr2. One end of the clamp capacitor C3 is coupled with a series connecting point of the zener diode ZD1 and the charge-discharge capacitor C1 which are coupled with the transistor Tr1 on a high potential side. The other end of the clamp capacitor C3 is coupled with an emitter of the transistor Tr2 on a low potential side. Accordingly, a surge voltage applied to the transistors Tr1 and Tr2 can be restricted.

The transistors Tr1 and Tr2 respectively include free wheel diodes D1 and D2 that are coupled between the collector and the emitter in antiparallel. In each of the diodes D1 and D2, a reverse recovery current (or a recovery current) as a reverse current flows just after a reverse voltage is applied. Thus, when the transistor Tr1 on the high-potential side is activated, the recovery current of the free wheel diode D2 coupled with the transistor Tr2 on the low potential side flows to the transistor Tr1 on the high potential side. When the transistor Tr2 on the low-potential side is activated, the recovery current of the free wheel diode D1 coupled with the transistor Tr1 on the high potential side flows to the transistor Tr2 on the low potential side. Thus, at the transistors Tr1 and Tr2, power dissipation associated with the recovery current is generated.

Japanese Unexamined Patent Application Publication No. 10-262371 discloses a circuit that can restrict recovery current. As shown in FIG. 18, the circuit includes a saturable reactor L, a capacitor C, and a resistor R. The saturable reactor L is coupled in series with a diode D. The capacitor C and the resistor R are coupled in series. The capacitor C and the resistor R coupled in series are coupled in parallel with the diode D and the saturable reactor L coupled in series. Accordingly, a recovery current of the diode D can be absorbed and can be restricted.

When the circuit for restricting the recovery current is applied to the power converter, a circuit including a saturable reactor, a capacitor and a resistor is required for each free wheel diode. Thus, a structure becomes complex and a cost increases.

SUMMARY OF THE INVENTION

In view of the foregoing problems, it is an object of the present invention to provide a switching device that can reduce power dissipation associated with a recovery current while reducing a surge voltage, with a simple configuration.

A switching device according to an aspect of the present invention includes a plurality of semiconductor switching elements, a smoothing capacitor, and a snubber circuit. The semiconductor switching elements are coupled in series. Each of the semiconductor switching elements includes a free wheel diode. The smoothing capacitor is coupled in parallel with a direct current power source and the semiconductor switching elements. The smoothing capacitor smoothes an output of the direct current power source and supplies the smoothed output to the semiconductor switching elements. The snubber circuit is coupled between a first connecting point and a second connecting point in parallel with the semiconductor switching elements. An inductance of a first channel provided from the first connecting point to the second connecting point through the smoothing capacitor is equal to or more than 10 times as large as an inductance of a second channel including the semiconductor switching elements and the snubber circuit.

In the above-described switching device, a surge voltage can be restricted by the snubber circuit. In addition, power dissipation associated with a recovery current can be restricted by coupling the snubber circuit in the above-described manner.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

A switching device according to a first embodiment of the present invention can be suitably used for, for example, a motor control device disposed in a vehicle. A motor control device 1 according to the present embodiment will be described with reference to FIG. 1 and FIG. 2.

Figure 1:
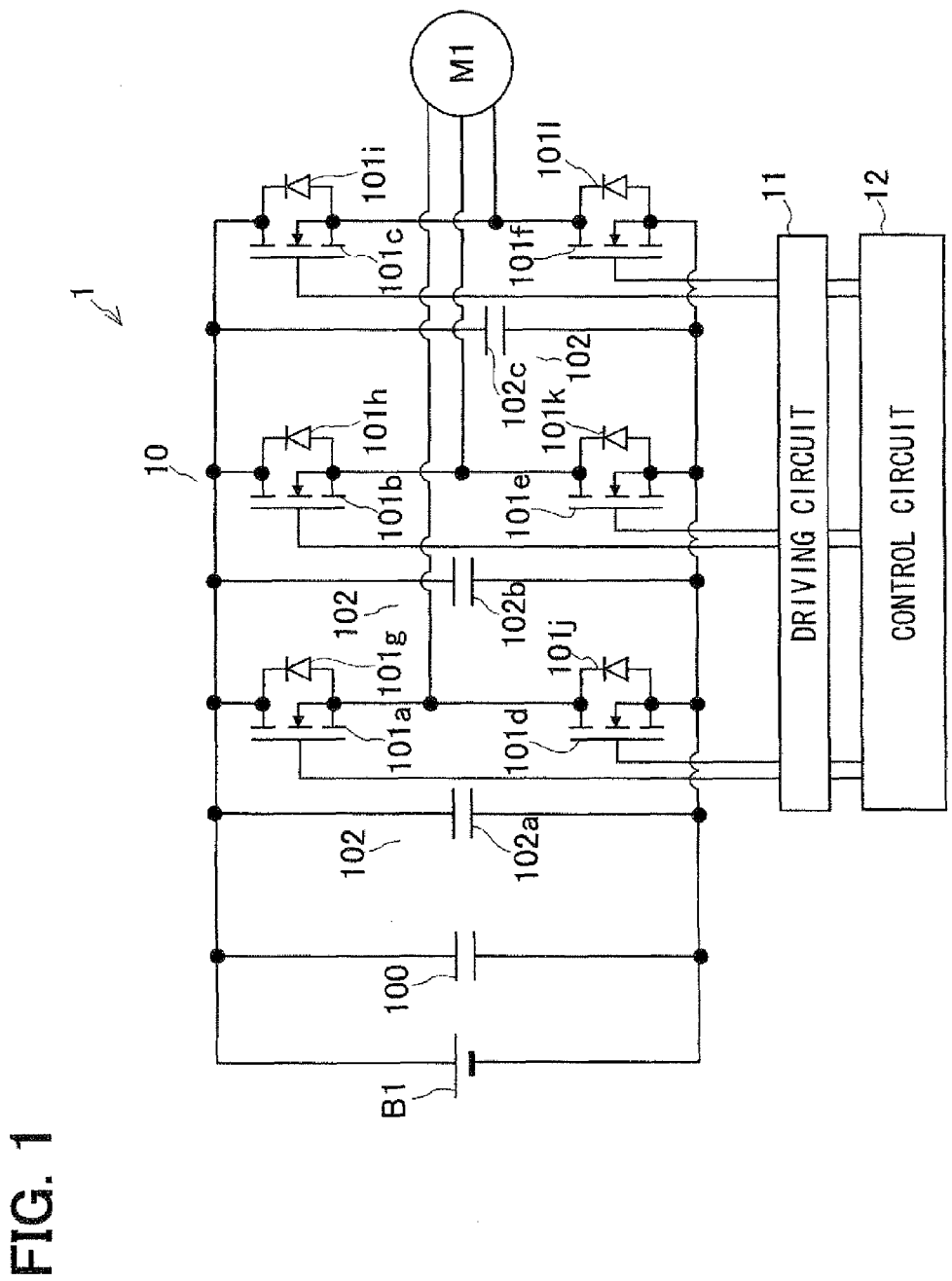
FIG. 1 is a circuit diagram showing a motor control device according to a first embodiment of the present invention.

A three-phase alternating current (AC) motor M1 shown in FIG. 1 is disposed in a vehicle. The three-phase AC motor M1 generates driving force when three-phase AC voltage is supplied.

The motor control device 1 is disposed in a vehicle. The motor control device 1 can operate as a power converter. The motor control device 1 converts direct current (DC) voltage output from a battery 61 (direct current power source) into three-phase AC voltage and supplies the three-phase AC voltage to three-phase AC motor M1. In other words, the motor control device 1 converts DC power to AC power and supplies the AC power to the three-phase AC motor M1. The motor control device 1 includes an inverter circuit 10, a driving circuit 11, and a control circuit 12.

The inverter circuit 10 can operate as a switching device. The inverter circuit 10 converts the DC voltage output from the battery B1 into the three-phase AC voltage. The inverter circuit 10 includes a smoothing capacitor 100, field-effect transistors (FETs) 101a-101f, and a snubber circuit 102. The FETs 101a-101f can operate as semiconductor switching elements.

The smoothing capacitor 100 smoothes the DC voltage output from the battery B1. The smoothing capacitor 100 has a capacity of from 100 µF to 2000 µF. One end of the smoothing capacitor 100 is coupled with a positive terminal of the battery B1 and the other end of the smoothing capacitor 100 is coupled with a negative terminal of the battery B1.

The FETs 101a-101f convert the DC voltage to the three-phase AC voltage by being activated and deactivated. The FETs 101a-101f include free wheel diodes 101g-101l, as body diodes that parasitize the FETs, respectively. Each of the free wheel diodes 101g-101l is coupled in antiparallel between a drain and a source. Cathodes of the free wheel diodes 101g-101l are coupled with sources of the FETs 101a-101f, respectively, and anodes of the free wheel diodes 101g-101l are coupled with drains of the FETs 101a-101f, respectively. The FET 101a and the FET 101d are coupled in series, the FET 101b and the FET 101e are coupled in series, and the FET 101c and 101f are coupled in series. Specifically, the sources of the FETs 101a-101c are coupled with the drains of the FETs 101d-101f, respectively. The three pairs of FETs 101a and 101d, the FETs 101b and 101e, and the FETs 101c and 101f are coupled in parallel. The drains of the FETs 101a-101c are coupled with the one end of the smoothing capacitor 100, and the sources of the FETs 101d-101f are coupled with the other end of the smoothing capacitor 100. The gates of the FETs 101a-101f are coupled with the driving circuit 11. A series connecting point of the FETs 101a and 101d, a series connecting point of the FETs 101b and 101e, a series connecting point of the FETs 101c and 101f are coupled with the three-phase AC motor M1.

The snubber circuit 102 restricts a surge voltage, which is generated due to stray inductances of wirings when the FETs 101a-101f are deactivated and is applied to the FETs 101a-101f. The snubber circuit 102 includes capacitors 102a-102c each having a capacity of from 0.01 µF to 5 µF.

Figure 2:
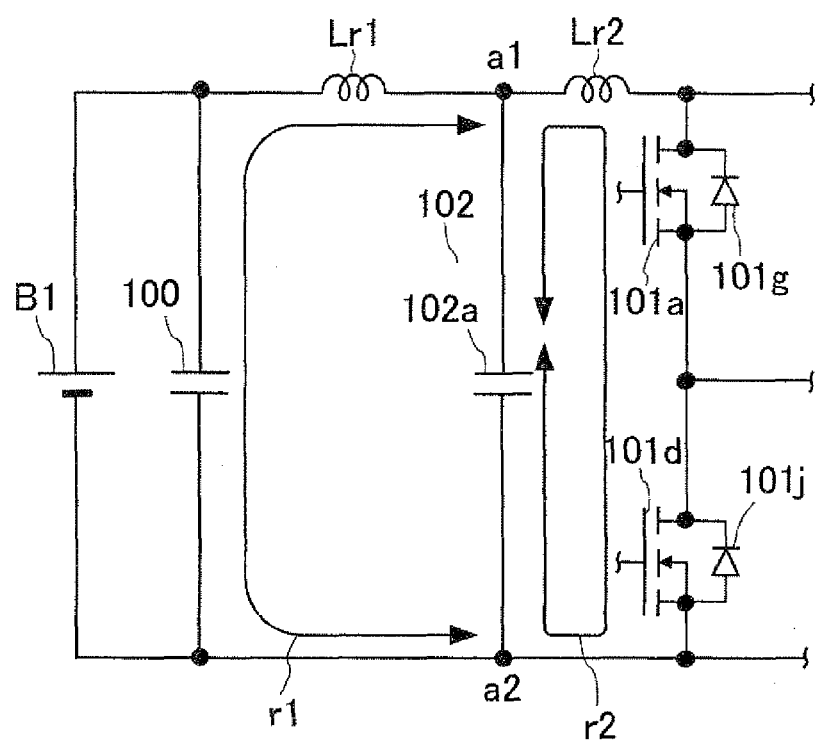
FIG. 2 is a diagram showing a connection of a snubber circuit in the motor control device according to the first embodiment.

The capacitor 102a is coupled in parallel with the FETs 101a and 101d which are coupled in series. As shown in FIG. 2, the capacitor 102a is coupled between connecting points a1 and a2. A channel r1 (first channel) provided from the connecting point a1 (as the first connecting point described above) to the connecting point a2 (as the second connecting point described above) through the smoothing capacitor 100 has an inductance Lr1. A channel r2 (second channel) including FETs 101a and 101d and the capacitor 102a has an inductance Lr2. The inductance Lr1 is 10 times as large as the inductance Lr2. For example, the inductance Lr1 is from 20 nH to 200 nH, and the inductance Lr2 is from 2 nH to 10 nH (equal to or less than 10 nH). The inductance Lr1 is the whole inductance of the channel Lr1 including the stray inductances of the smoothing capacitor 100 and the wirings in the first channel r1. The inductance Lr2 is the whole inductance of the channel Lr2 including the stray inductances of the FETs 101a and 101d, the capacitor 102a, and the wirings in the channel r2

The capacitor 102b is coupled in parallel with the FETs 101b and 101e which are coupled in series. The capacitor 102b is coupled at a position that an inductance of a channel (first channel) provided from one connecting point of the capacitor 102b to the other connecting point of the capacitor 102b through the smoothing capacitor 100 is 10 times as large as an inductance of a channel (second channel) including the FETs 101b and 101e and the capacitor 102b.

The capacitor 102c is coupled in parallel with the FETs 101c and 101f which are coupled in series. The capacitor 102c is coupled at a position that an inductance of a channel (first channel) provided from one connecting point of the capacitor 102c to the other connecting point of the capacitor 102c through the smoothing capacitor 100 is 10 times as large as an inductance of a channel (second channel) including the FETs 101c and 101f and the capacitor 102c.

The driving circuit 11 activates and deactivates the FETs 101a-101f based on a driving signal input from the control circuit 12. The driving circuit 11 is coupled with the gates of the FETs 101a-101f.

The control circuit 12 outputs the driving signal for activating and deactivating the FETs 101a-101f based on a command input from an external device. The control circuit 12 is coupled with the driving circuit 11.

An operation of the motor control device 1 will be described with reference to FIG. 1 to FIG. 4B. Power dissipation of a FET means the product of a drain-source voltage and a drain current of the FET.

The control circuit 12 outputs the driving signal for activating and deactivating the FETs 101a-101f based on a command input from an external device. The driving circuit 11 activates and deactivates the FETs 101a-101f based on the driving signal input from the control circuit 12. Accordingly, the DC voltage output from the battery B1 and smoothed by the smoothing capacitor 100 is converted into the three-phase AC voltage, and the three-phase AC voltage is supplied to the three-phase AC motor M1.

Figure 3A:
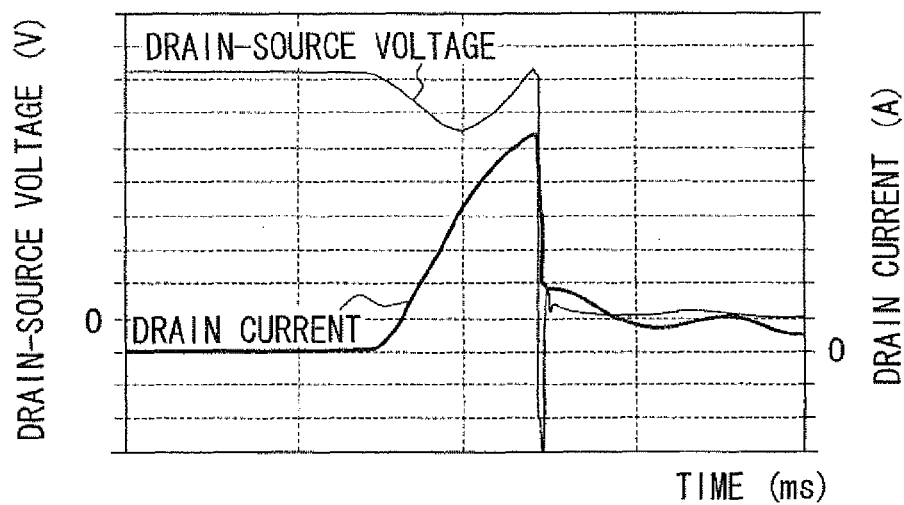
FIG. 3A is a graph showing a simulation result of a drain-source voltage and a drain current of a FET according to a comparative example.
Figure 3B:
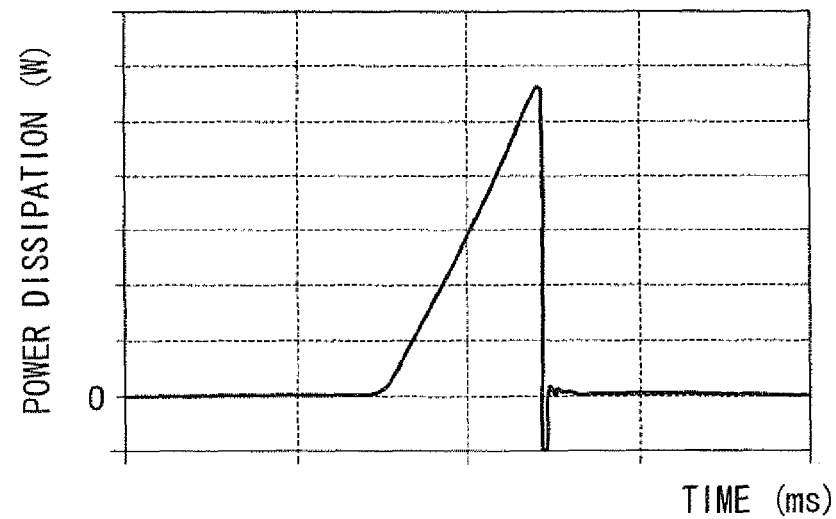
FIG. 3B is a graph showing a simulation result of power dissipation of the FET according to the comparative example.
Figure 4A:
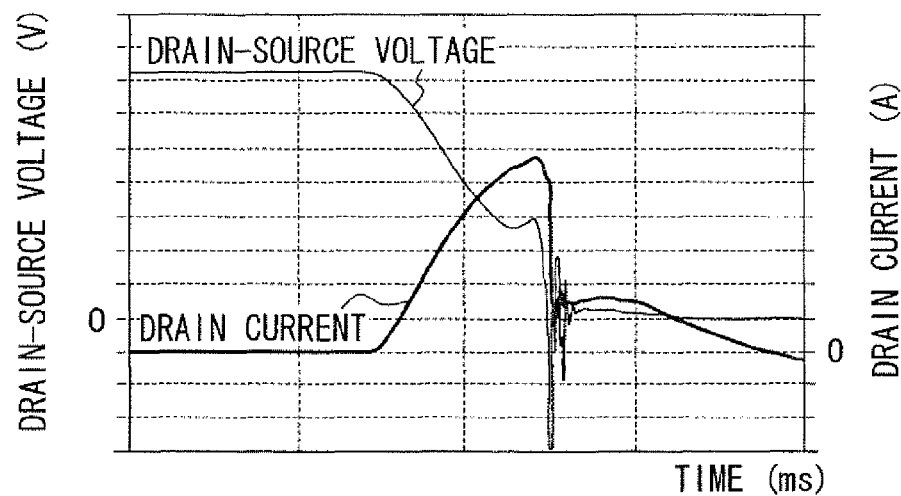
FIG. 4A is a graph showing a simulation result of a drain-source voltage and a drain current of a FET according to the first embodiment.
Figure 4B:
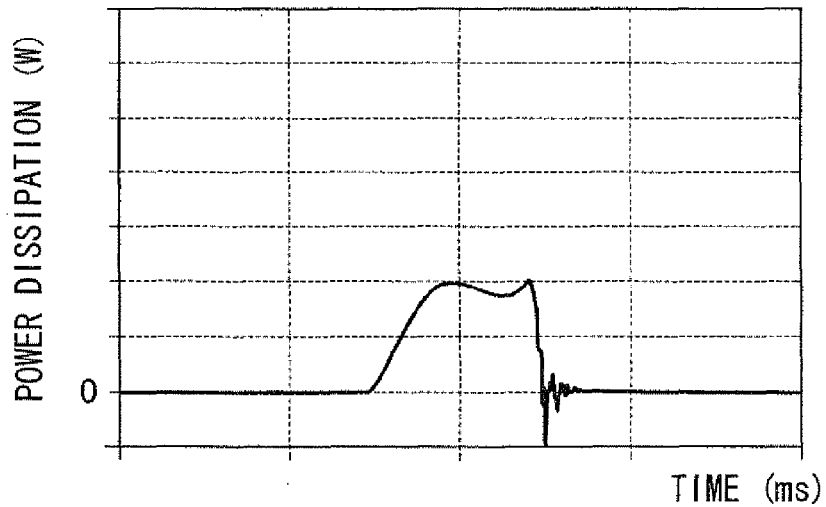
FIG. 4B is a graph showing a simulation result of power dissipation of the FET according to the first embodiment.

When the FET 101a is activated, a recovery current of the free wheel diode 101j coupled with the FET 101d flows to the FET 101a. For example, in a comparative example in which the snubber circuit 102 is coupled at a position that the inductance Lr1 of the channel r1 is same as the inductance Lr2 of the channel r2, a recovery current and power dissipation associated with the recovery current are generated as shown in FIG. 3A and FIG. 3B. In the present embodiment, the snubber circuit 102 is coupled at a position that the inductance Lr1 of the channel r1 is 10 times as large as the inductance Lr2 of the channel r2. Thus, as shown in FIG. 4A, the recovery current can be restricted compared with the comparative example shown in FIG. 3A. Therefore, as shown in FIG. 4A, the power dissipation of the FET associated with the recovery current can be restricted compared with the comparative example shown in FIG. 3B.

In the motor control device 1 according to the present embodiment, the snubber circuit 102 can restrict the surge voltage. In addition, by controlling the connecting position of the snubber circuit 102, the recovery current can be restricted. Thus, in the motor control device 1, the surge voltage and the power dissipation associated with the recovery current can be restricted without an additional circuit for restricting the recovery current.

In the present embodiment, the inductance Lr1 of the channel r1 includes the stray inductances of the smoothing capacitor 100 and the wiring in the channel r1. The inductance Lr2 of the channel r2 includes the stray inductances of the FETs 101a and 101d, the capacitor 102a, and the wirings in the channel r2. Because the stray inductances are used, a coil for controlling an inductance of each channel is not required. Thus, the surge voltage and the power dissipation associated with the recovery current can be restricted with a simple configuration.

Furthermore, the surge voltage can be certainly restricted by the snubber circuit 102 including the capacitors 102a-102c.

In the present embodiment, the surge voltage depends on the inductance Lr2 of the channel r2. A stray inductance of a semiconductor switching device is about dozens of nH as described, for example, in "Reduction of Circuit Inductance in Power Modules for Electric Vehicles" by Takayuki Murai et al. in YAMAHA MOTOR TECHNICAL REVIEW 2003-4 No. 37, and Japanese Patent No. 3,519,227. Thus, the surge voltage can be certainly restricted by controlling the connecting position of the snubber circuit 102 and setting the inductance Lr2 of the channel r2 to be equal to or less than 10 nH.

Figure 5:
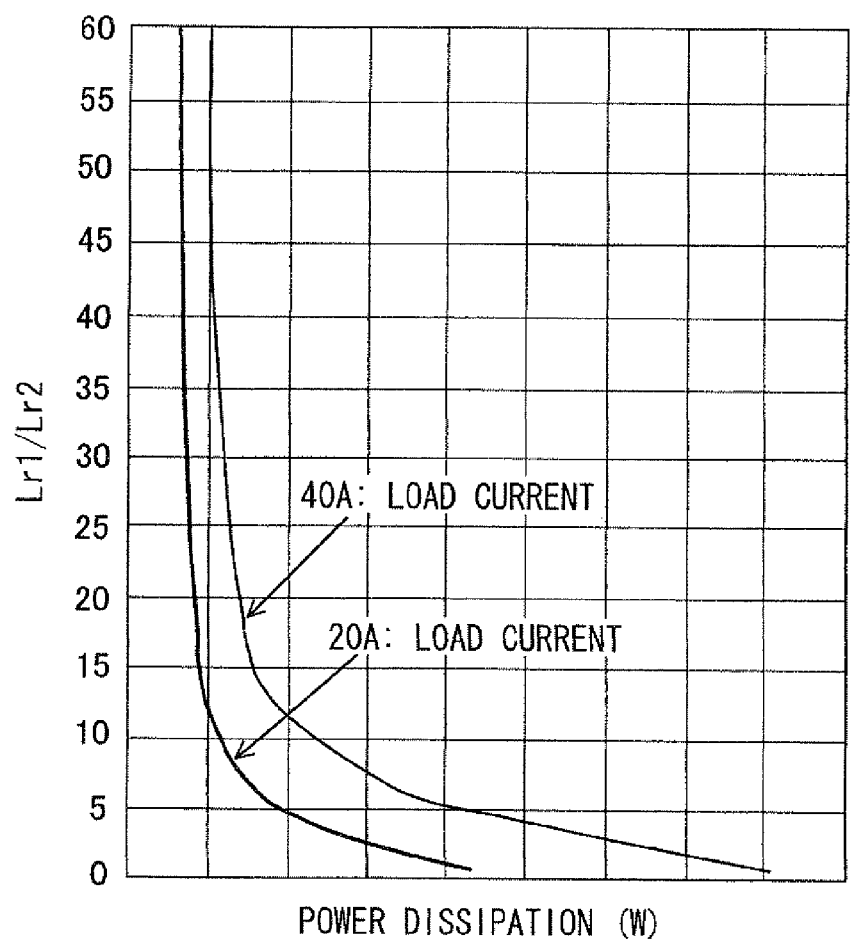
FIG. 5 is a graph showing a simulation result of a relationship between a ratio of an inductance Lr1 of a channel r1 to an inductance Lr2 of a channel r2 and a power dissipation of the FET associated with a recovery current.

In the present embodiment, the snubber circuit 102 is coupled at the position that the inductance Lr1 of the channel r1 is 10 times as large as the inductance Lr2 of the channel Lr2, as an example. The snubber circuit 102 may also be coupled at a different position. FIG. 5 is a graph showing a simulation result of a relationship between the power dissipation of the FET associated with the recovery current and a ratio of the inductance Lr1 of the channel r1 to the inductance Lr2 of the channel r2. In the simulation, a load current is 20 A or 40 A, the inductance Lr2 is 5 nH, and the inductance Lr1 is from 5 nH to 300 nH. In FIG. 5, the power dissipation of the FET means a time average of the product of the drain-source voltage and the drain current of the FET.

As shown in FIG. 5, in a range that the inductance Lr1 is less than 5 times as large as the inductance Lr2, the power dissipation of the FET associated with the recovery current is reduced as the ratio of the inductance Lr1 to the inductance Lr2 increases. At the point where the inductance Lr1 is 5 times as large as the inductance Lr2, a reducing rate of the power dissipation of the FET starts to change. At the point where the inductance Lr1 is 10 times as large as the inductance Lr2, the graph of the power dissipation of the FET starts to flatten. At a point where the inductance Lr1 is 15 times as large as the inductance Lr2, the graph of the power dissipation of the FET is almost flattened. Thus, when the snubber circuit 102 is coupled at a position that the inductance Lr1 of the channel r1 is equal to or more than 10 times as large as the inductance Lr2 of the channel r2, the power dissipation of the FET associated with the recovery current can be sufficiently restricted. Furthermore, when the snubber circuit 102 is coupled at a position that the inductance Lr1 is equal to or more than 15 times as large as the inductance Lr2, the power dissipation of the FET associated with the recovery current can be restricted more certainly.

In the above-described embodiment, the inductance Lr1 of the channel r1 is the stray inductances of the smoothing capacitor 100 and the wiring in the channel r1, as an example. A coil may be disposed in the channel r1. In the present case, the inductance Lr1 includes the stray inductances of the smoothing capacitor 100 and the wiring in the channel r1 and an inductance of the coil. The inductance of the coil is set so that the inductance Lr1 of the channel r1 is equal to or more than 10 times as large as the inductance Lr2 of the channel r2. Thus, the inductance Lr1 of the channel r1 is certainly equal to or more than 10 times as large as the inductance Lr2 of the channel r2.

In the present embodiment, an inverter circuit, in which three pairs of FETs coupled in series are coupled in parallel, is taken as an example. The present embodiment may also be applied to a converter circuit that includes a pair of FETs coupled in series or a H bridge circuit that includes two pairs of FETs coupled in series. The present embodiment may also be applied to a circuit that includes a bipolar transistor or an insulated gate bipolar transistor including a free wheel diode. Also in the present case, power dissipation of the free wheel diode associated with a recovery current can be restricted while restricting a surge voltage.

Second Embodiment

A motor control device 2 according to a second embodiment of the present invention will be described with reference to FIG. 6 and FIG. 7. In the motor control device 2, a configuration of a snubber circuit is different from the configuration of the snubber circuit 102 according to the first embodiment.

Figure 6:
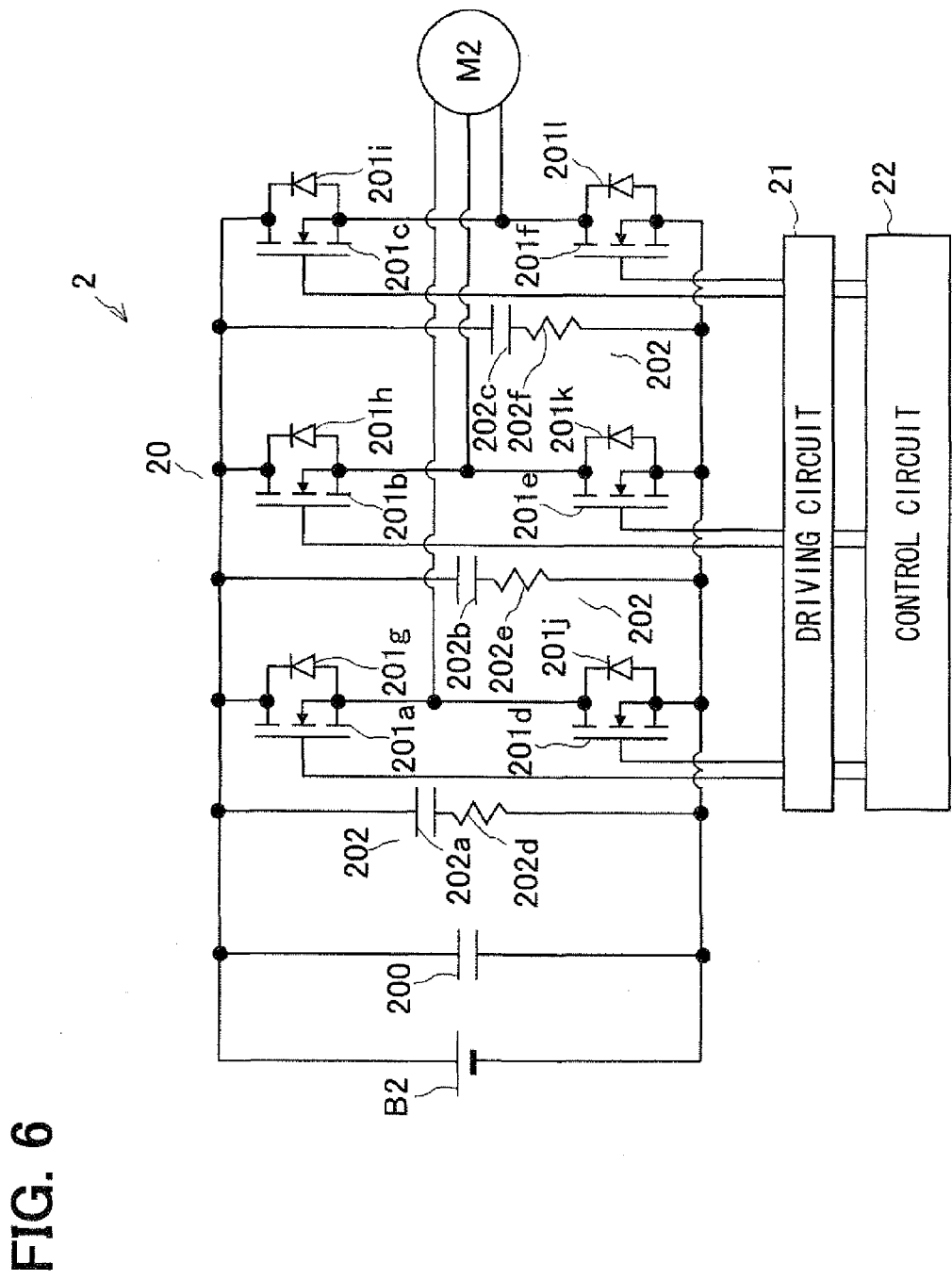
FIG. 6 is a circuit diagram showing a motor control device according to a second embodiment of the present invention.
Figure 7:
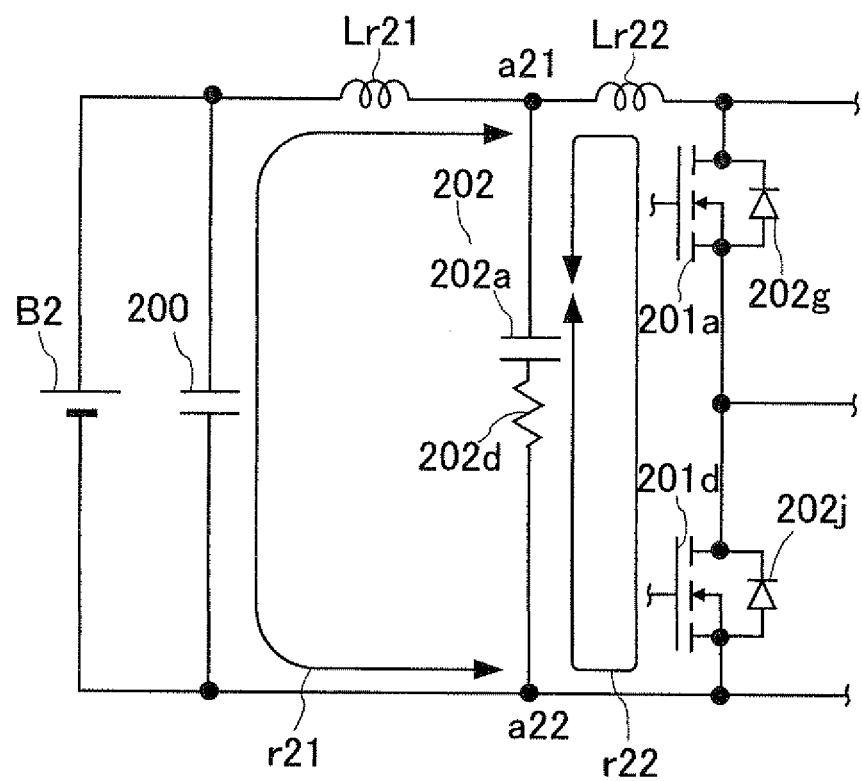
FIG. 7 is a diagram showing a connection of a snubber circuit in the motor control device according to the second embodiment.

As shown in FIG. 6, the motor control device 2 includes an inverter circuit 20, a driving circuit 21, and a control circuit 22. The inverter circuit 20 can operate as a switching device. The driving circuit 21 and the control circuit 22 have configurations similar to the configurations of the driving circuit 11 and the control circuit 12 according to the first embodiment. The inverter circuit 20 is coupled with a battery B2 and a three-phase AC motor M2.

The inverter circuit 20 includes a smoothing capacitor 200, FETs 201a-201f, and a snubber circuit 202. The FETs 201a-201f can operate as semiconductor switching elements. The smoothing capacitor 200 has a configuration similar to the smoothing capacitor 100 according to the first embodiment. The FETs 201a-201f have configurations similar to the FETs 101a-101f according to the first embodiment. The FETs 201a-201f include free wheel diodes 201g-201l, respectively.

The snubber circuit 202 includes capacitors 202a-202c and resistors 202d-202f. The capacitor 202a and the resistor 202d are coupled in series, the capacitor 202b and the resistor 202e are coupled in series, and the capacitor 202c and the resistor 202f are coupled in series.

The capacitor 202a and the resistor 202d which are coupled in series are coupled in parallel with the FETs 201a and 201d which are coupled in series. As shown in FIG. 7, the capacitor 202a is coupled at a connecting point a21, and the resistor 202d is coupled at a connecting point a21. An inductance Lr21 of a channel r21 (first channel) provided from the connecting point a21 to the connecting point a22 through the smoothing capacitor 200 is 10 times as large as an inductance Lr22 of a channel r22 (second channel) including the FETs 201a and 201d which are coupled in series and the capacitor 202a and the resistor 202d which are coupled in series.

As shown in FIG. 6, the capacitor 202b and the resistor 202e which are coupled in series are coupled in parallel with the FETs 201b and 201e which are coupled in series. An inductance of a channel (first channel) provided from a connecting point of the capacitor 202b to a connecting point of the resistor 202e through the smoothing capacitor 200 is 10 times as large as an inductance of a channel (second channel) including the FETs 201b and 201e which are coupled in series and the capacitor 202b and the resistor 202e which are coupled in series.

The capacitor 202c and the resistor 202f which are coupled in series are coupled in parallel with the FETs 201c and 201f which are coupled in series. An inductance of a channel (first channel) provided from a connecting point of the capacitor 202c to a connecting point of the resistor 202f through the smoothing capacitor 200 is 10 times as large as an inductance of a channel (second channel) including the FETs 201c and 201f which are coupled in series and the capacitor 202c and the resistor 202f which are coupled in series.

Figure 8A:
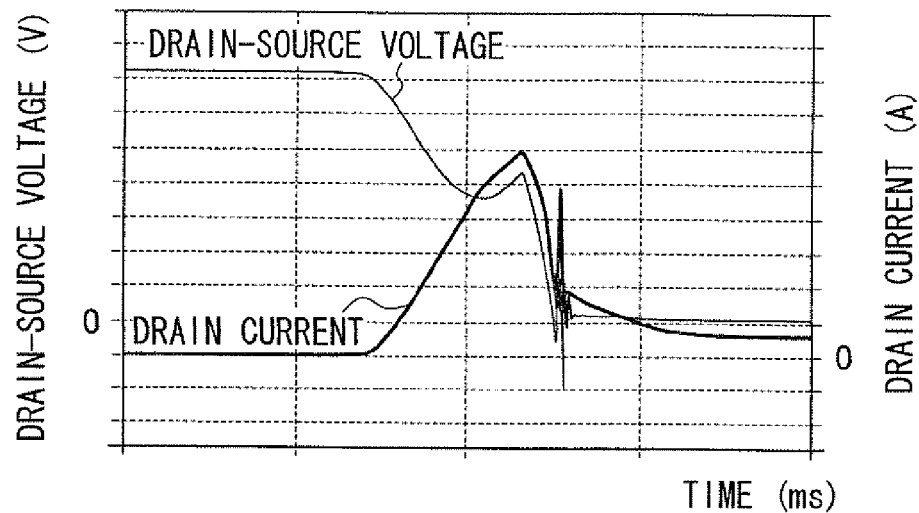
FIG. 8A is a graph showing a simulation result of a drain-source voltage and a drain current of a FET according to the second embodiment.
Figure 8B:
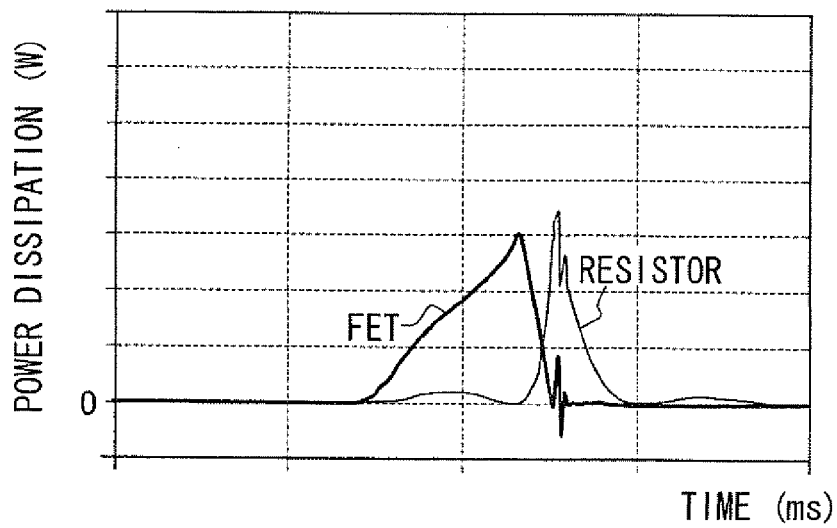
FIG. 8B is a graph showing a simulation result of power dissipation of the FET and power dissipation of a resistor according to the second embodiment.

Because an operation of the motor control device 2 is similar to the operation of the motor control device 1 according to the first embodiment, a description of the operation of the motor control device 2 will be omitted. Losses of a FET and a resistor will be described with reference to FIG. 8A and FIG. 8B. FIG. 8A is a graph showing a simulation result of a drain-source voltage and a drain current of a FET when the FET in the present embodiment is activated, and FIG. 8B is a graph showing a simulation result of power dissipation of the FET and a resistor. Power dissipation of the FET means the product of the drain-source voltage and the drain current of the FET. Power dissipation is also generated at the resistors 202d-202f in the snubber circuit 202. Thus, a part of the power dissipation of the FETs 201a-201f can be shifted to the resistors 202d-202f, and the power dissipation generated at the FETs 201a-201f can be reduced. Therefore, as shown in FIG. 8B, the power dissipation associated with the recovery current can be restricted.

In the present embodiment, the number of parts including in the snubber circuit 202 is increased compared with the snubber circuit 102 according to the first embodiment. However, the surge voltage and the power dissipation associated with the recovery current can be restricted. In addition, because a part of the power dissipation of the FETs 201a-201f can be shifted to the resistors 202d-202f in the snubber circuit 202, the power dissipation of the FETs 201a-201f can be reduced. Thus, an inexpensive FET can be used, and a cost of the motor control device 2 can be reduced.

Third Embodiment

A motor control device 3 according to a third embodiment of the present invention will be described with reference to FIG. 9 and FIG. 10. In the motor control device 3, a configuration of a snubber circuit is different from the configuration of the snubber circuit 102 according to the first embodiment.

Figure 9:
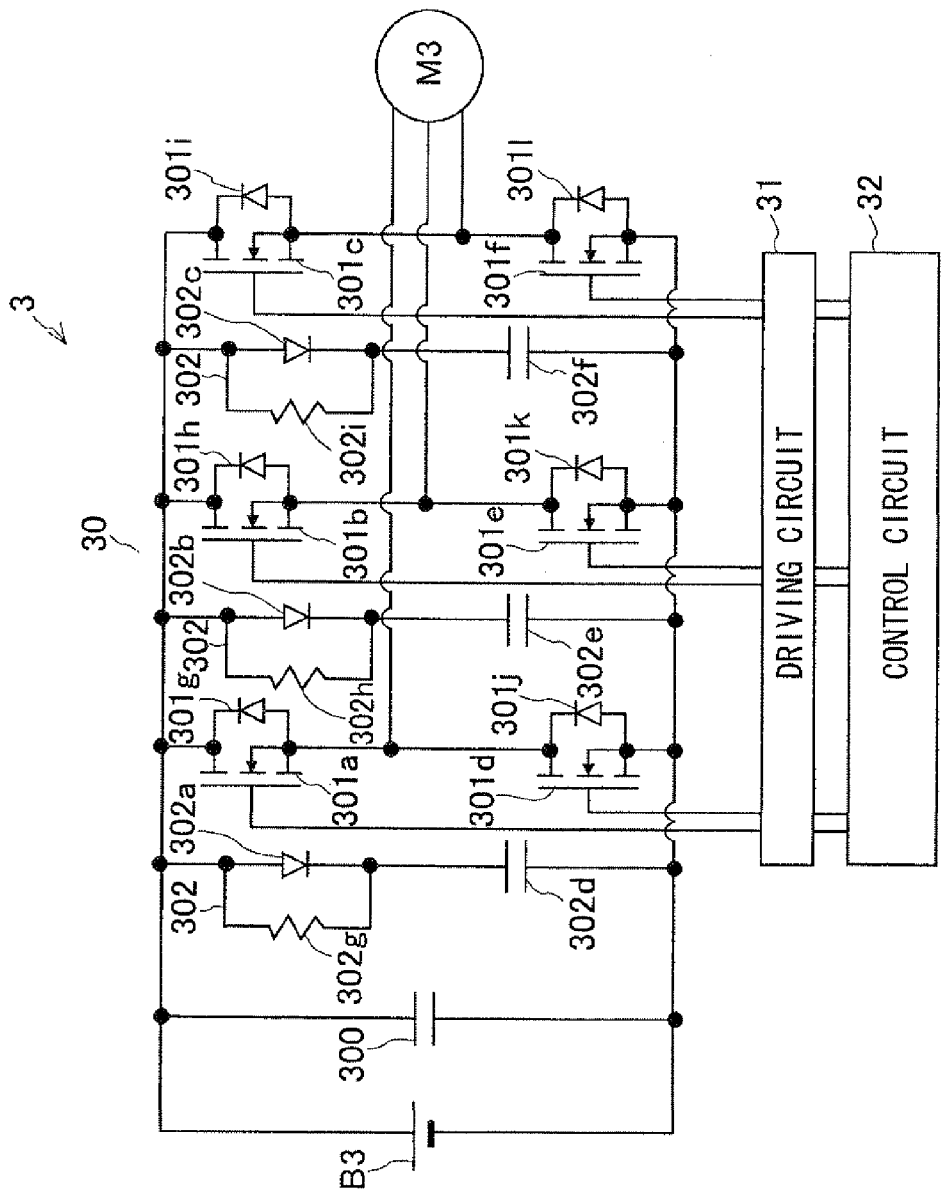
FIG. 9 is a circuit diagram showing a motor control device according to a third embodiment of the present invention.
Figure 10:
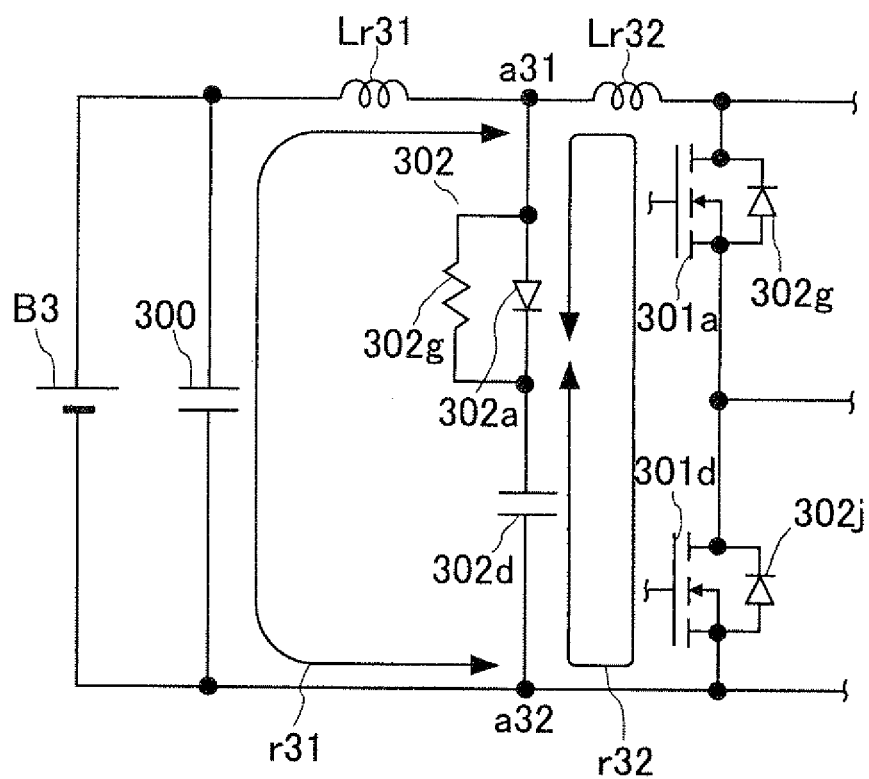
FIG. 10 is a diagram showing a connection of a snubber circuit in the motor control device according to the third embodiment.

As shown in FIG. 9, the motor control device 3 includes an inverter circuit 30, a driving circuit 31, and a control circuit 32. The inverter circuit 30 can operate as a switching device. The driving circuit 31 and the control circuit 32 have configurations similar to the configurations of the driving circuit 11 and the control circuit 12 according to the first embodiment. The inverter circuit 30 is coupled with a battery B3 and a three-phase AC motor M3.

The inverter circuit 30 includes a smoothing capacitor 300, FETs 301a-301f, and a snubber circuit 302. The FETs 301a-301f can operate as semiconductor switching elements. The smoothing capacitor 300 has a configuration similar to the smoothing capacitor 100 according to the first embodiment. The FETs 301a-301f have configurations similar to the FETs 101a-101f according to the first embodiment. The FETs 301a-301f include free wheel diodes 301g-301l, respectively.

The snubber circuit 302 includes diodes 302a-302c (rectifying elements), capacitors 302d-302f, and resistors 302g-302i. Each of the diodes 302a-302c is a silicon carbide schottky barrier diode or a silicon carbide junction barrier schottky diode. The diode 302a and the capacitor 302d are coupled in series, the diode 302b and the capacitor 302e are coupled in series, and the diode 302c and the capacitor 302f are coupled in series. The resistor 302g is coupled in parallel with the diode 302a, the resistor 302h is coupled in parallel with the diode 302b, and the resistor 302i is coupled in parallel with the diode 302c.

The snubber circuit 302 including the diode 302a, the capacitor 302d, and the resistor 302g is coupled in parallel with the FETs 301a and 301d which are coupled in series. As shown in FIG. 10, the snubber circuit 302 is coupled between connecting points a31 and a32. An inductance Lr31 of a channel r31 (first channel) provided from the connecting point a31 to the connecting point a32 through the smoothing capacitor 300 is 10 times as large as an inductance Lr32 of a channel r32 (second channel) including the FETs 301a and 301d which are coupled in series and the snubber circuit 302 which includes the diode 302a, the capacitor 302d, and the resistor 302g.

The snubber circuit 302 including the diode 302b, the capacitor 302e, and the resistor 302h is coupled in parallel with the FETs 301b and 301e which are coupled in series. A inductance of a channel (first channel) provided from a connecting point of the diode 302b to a connecting point of the capacitor 302e through the smoothing capacitor 300 is 10 times as large as an inductance of a channel (second channel) including the FETs 301b and 301e which are coupled in series and the snubber circuit 302 which includes the diode 302b, the capacitor 302e, and the resistor 302h.

The snubber circuit 302 including the diode 302c, the capacitor 302f, and the resistor 302i is coupled in parallel with the FETs 301c and 301f which are coupled in series. A inductance of a channel (first channel) provided from a connecting point of the diode 302c to a connecting point of the capacitor 302f through the smoothing capacitor 300 is 10 times as large as an inductance of a channel (second channel) including the FETs 301c and 301f which are coupled in series and the snubber circuit 302 which includes the diode 302c, the capacitor 302f, and the resistor 302i.

Because an operation of the motor control device 3 is similar to the operation of the motor control device 1 according to the first embodiment, a description of the operation of the motor control device 3 will be omitted. Power dissipation of a FET will be described with reference to FIG. 9 to FIG. 12. The power dissipation of the FET means the product of a drain-source voltage and a drain current of the FET.

Figure 11A:
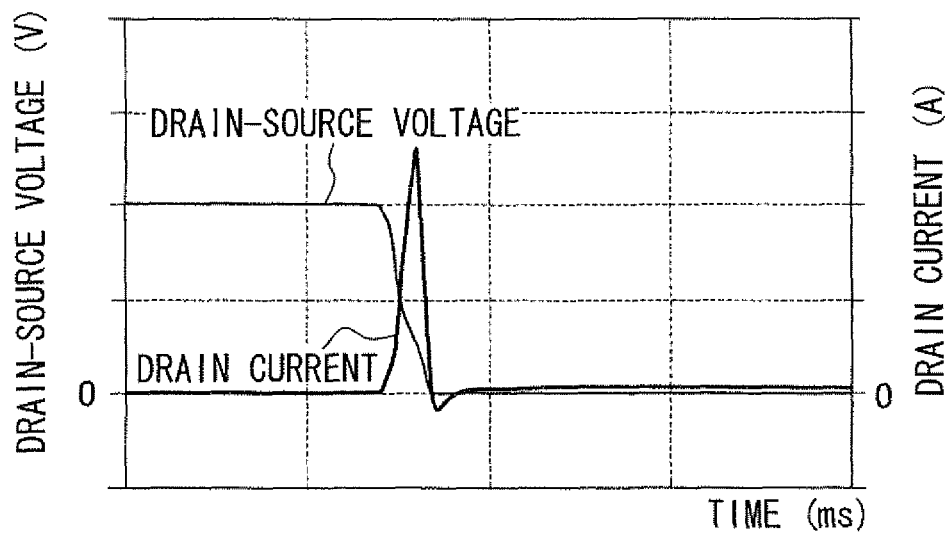
FIG. 11A is a graph showing a simulation result of a drain-source voltage and a drain current of a FET according to a comparative example.
Figure 11B:
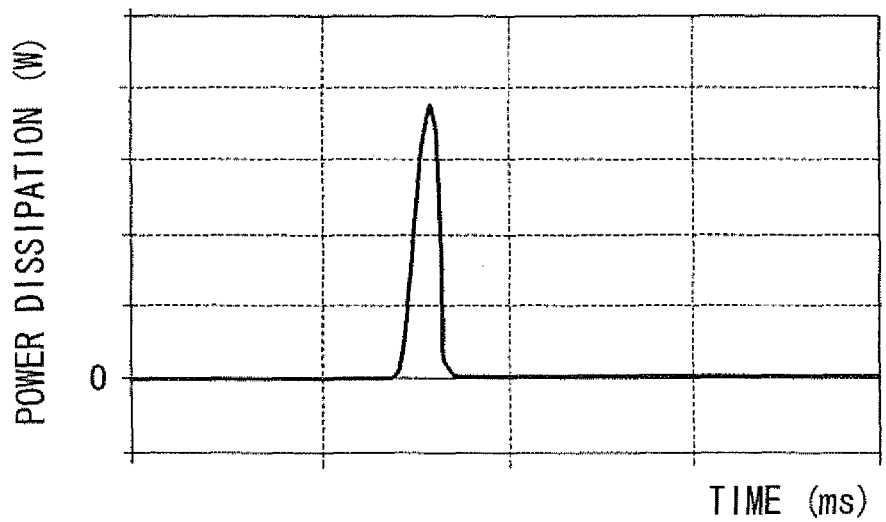
FIG. 11B is a graph showing a simulation result of power dissipation of the FET according to the comparative example.
Figure 12A:
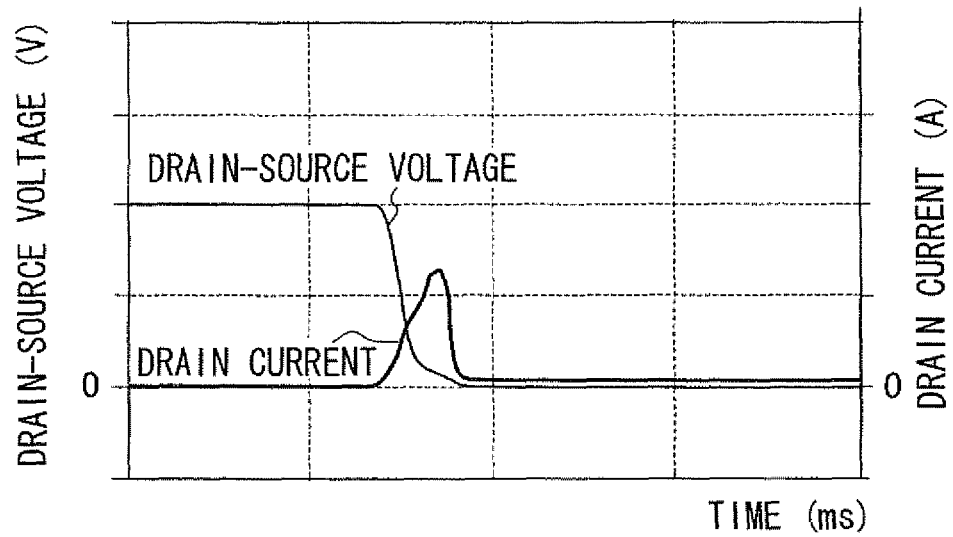
FIG. 12A is a graph showing a simulation result of a drain-source voltage and a drain current of a FET according to the third embodiment.
Figure 12B:
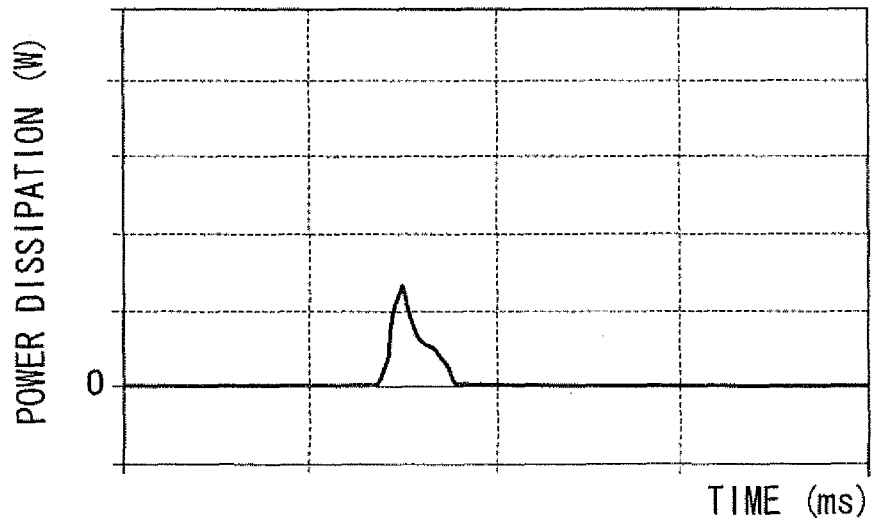
FIG. 12B is a graph showing a simulation result of power dissipation of the FET according to the third embodiment.

When the FET 301a is activated, a recovery current of the free wheel diode 301j coupled with the FET 301d flows to the FET 301a. For example, in a comparative example in which the snubber circuit 302 is coupled at a position that the inductance Lr31 of the channel r31 is same as the inductance Lr32 of the channel r32, a recovery current and a power dissipation of the FET associated with the recovery current are generated as shown in FIG. 11A and FIG. 11B. In the present embodiment, the snubber circuit 302 is coupled at a position that the inductance Lr31 of the channel r31 is 10 times as large as the inductance Lr32 of the channel r32. Thus, as shown in FIG. 12A, the recovery current can be restricted compared with the comparative example shown in FIG. 11A. Therefore, as shown in FIG. 12A, the power dissipation of the FET associated with the recovery loss can be restricted compared with the comparative example shown in FIG. 11B.

In the present embodiment, when the voltage applied to the snubber circuit 302 increases, the diodes 302a-302c are activated, and a resistance value of the snubber circuit 302 decreases. Thus, the surge voltage can be restricted. Therefore, a switching speed of the FETs 301a-301f can be increased and the power dissipation can be reduced. When the voltage applied to the snubber circuit 302 decreases, the diodes 302a-302c are not activated, and the resistance value of the snubber circuit 302 increases. Because the inductance Lr31 of the channel r31 exists, the voltage during activation can be reduced. Thus, even when the switching speed of the FETs 301-301f is increased, the recovery current and the power dissipation can be reduced.

In the present embodiment, each of the diodes 302a-302c is a silicon carbide schottky barrier diode or a silicon carbide junction barrier schottky diode. Thus, the surge voltage and the power dissipation associated with the recovery current can be further reduced.

Fourth Embodiment

A motor control device 4 according to a fourth embodiment of the present invention will be described with reference to FIG. 13 and FIG. 14. In the motor control device 4, a configuration of a snubber circuit is different from the configuration of the snubber circuit 102 according to the first embodiment.

Figure 13:
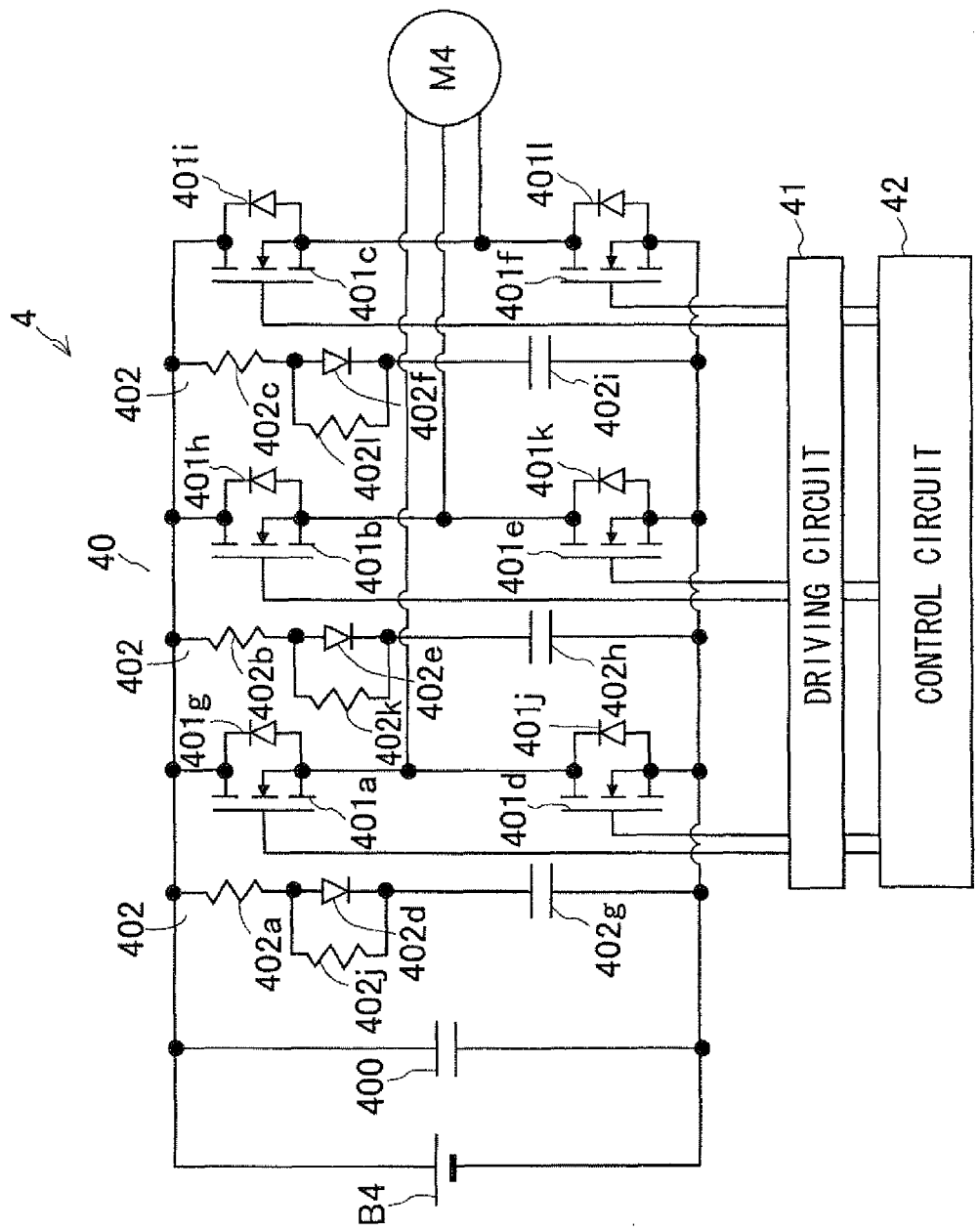
FIG. 13 is a circuit diagram showing a motor control device according to a fourth embodiment of the present invention.
Figure 14:
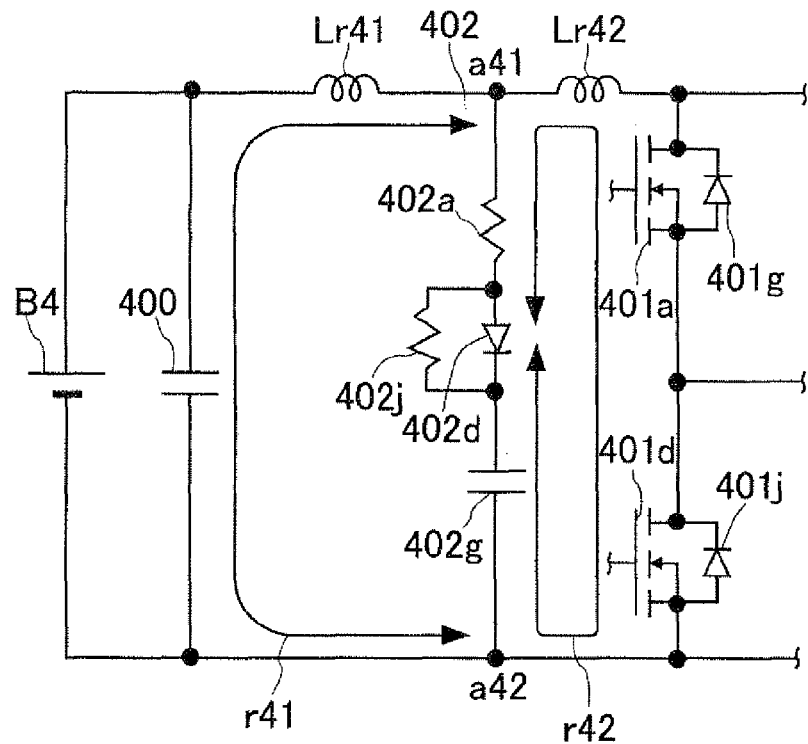
FIG. 14 is a diagram showing a connection of a snubber circuit in the motor control device according to the fourth embodiment.

As shown in FIG. 13, the motor control device 4 includes an inverter circuit 40, a driving circuit 41, and a control circuit 42. The inverter circuit 40 can operate as a switching device. The driving circuit 41 and the control circuit 42 have configurations similar to the configurations of the driving circuit 11 and the control circuit 12 according to the first embodiment. The inverter circuit 40 is coupled with a battery B4 and a three-phase AC motor M4.

The inverter circuit 40 includes a smoothing capacitor 400, FETs 401a-401f, and a snubber circuit 402. The FETs 401a-401f can operate as semiconductor switching elements. The smoothing capacitor 400 has a configuration similar to the smoothing capacitor 100 according to the first embodiment. The FETs 401a-401f have configurations similar to the FETs 101a-101f according to the first embodiment. The FETs 401a-401f include free wheel diodes 401g-401l, respectively.

The snubber circuit 402 includes resistors 402a-402c (first resistors), diodes 402d-402f (rectifying elements), capacitors 402g-402i, and resistors 402j-402l (second resistors). Each of the diodes 402d-402f is a silicon carbide schottky barrier diode or a silicon carbide junction barrier schottky diode. The resistor 402a, the diode 402d, and the capacitor 402g are coupled in series. The resistor 402b, the diode 402e, the capacitor 402h are coupled in series. The resistor 402c, the diode 402f, and the capacitor 402i are coupled in series. The resistor 402j is coupled in parallel with the diode 402d. The resistor 402k is coupled in parallel with the diode 402e. The resistor 402l is coupled in parallel with the diode 402f.

The snubber circuit 402 including the resistor 402a, the diode 402d, the capacitor 402g, and the resistor 402j is coupled in parallel with the FETs 401a and 401d which are coupled in series. As shown in FIG. 14, the resistor 402a is coupled at a connecting point a41. The capacitor 402g is coupled at a connecting point a42. An inductance Lr41 of a channel r41 (first channel) provided from the connecting point a41 to the connecting point a42 through the smoothing capacitor 400 is 10 times as large as an inductance Lr42 of a channel r41 (second channel) including the FETs 401a and 401d which are coupled in series and the snubber circuit 402 which includes the resistor 402a, the diode 402d, the capacitor 402g, and the resistor 402j.

As shown in FIG. 13, the snubber circuit 402 including the resistor 402b, the diode 402e, the capacitor 402h and the resistor 402k is coupled in parallel with the FETs 401b and 401e which are coupled in series. An inductance of a channel (first channel) provided from a connecting point of the resistor 402b to a connecting point of the capacitor 402h through the smoothing capacitor 400 is 10 times as large as an inductance of a channel (second channel) including the FETs 401b and 401d which are coupled in series and the snubber circuit 402 which includes the resistor 402b, the diode 402e, the capacitor 402h, and the resistor 402k.

The snubber circuit 402 including the resistor 402c, the diode 402f, the capacitor 402i, and the resistor 402l is coupled in parallel with the FETs 401c and 401f which are coupled in series. An inductance of a channel (first channel) provided from a connecting point of the resistor 402c to a connecting point of the capacitor 402i through the smoothing capacitor 400 is 10 times as large as an inductance of a channel (second channel) including the FETs 401c and 401f which are coupled in series and the snubber circuit 402 which includes the resistor 402c, the diode 402f, the capacitor 402i, and the resistor 402l.

Because an operation of the motor control device 4 is similar to the operation of the motor control device 1 according to the first embodiment, a description of the operation of the motor control device 4 will be omitted.

In the motor control device 4 according to the present embodiment, effects similar to the motor control device 3 according to the third embodiment can be achieved. In addition, the motor control device 4 according to the present embodiment can be used even when a resonance of the direct current voltage causes a problem.

Fifth Embodiment

Figure 16:
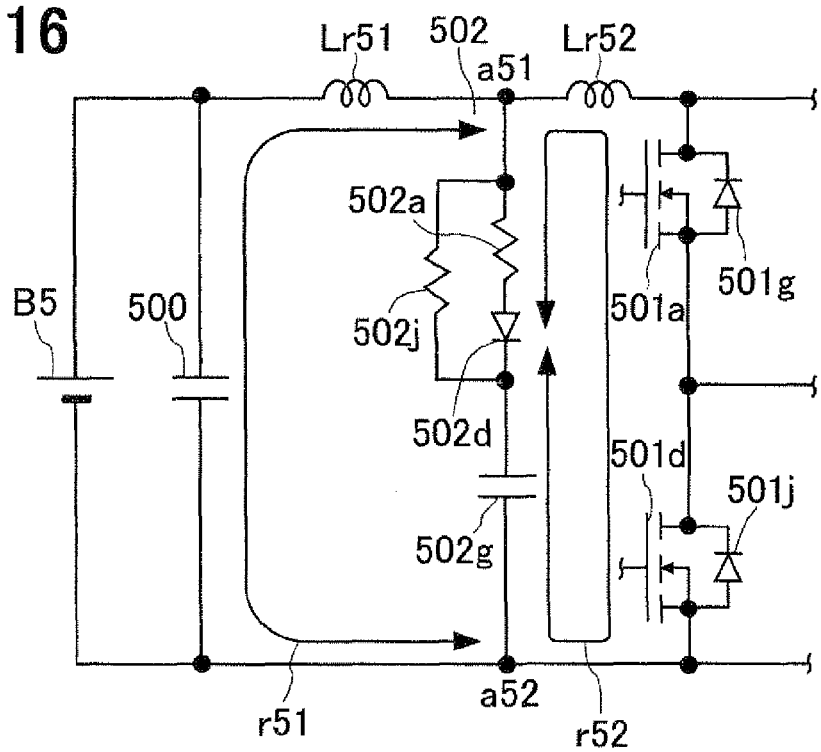
FIG. 16 is a diagram showing a connection of a snubber circuit in the motor control device according to the fifth embodiment.

A motor control device 5 according to a fifth embodiment of the present invention will be described with reference to FIG. 15 and FIG. 16. In the motor control device 5, a configuration of a snubber circuit is different from the configuration of the snubber circuit 102 according to the first embodiment.

Figure 15:
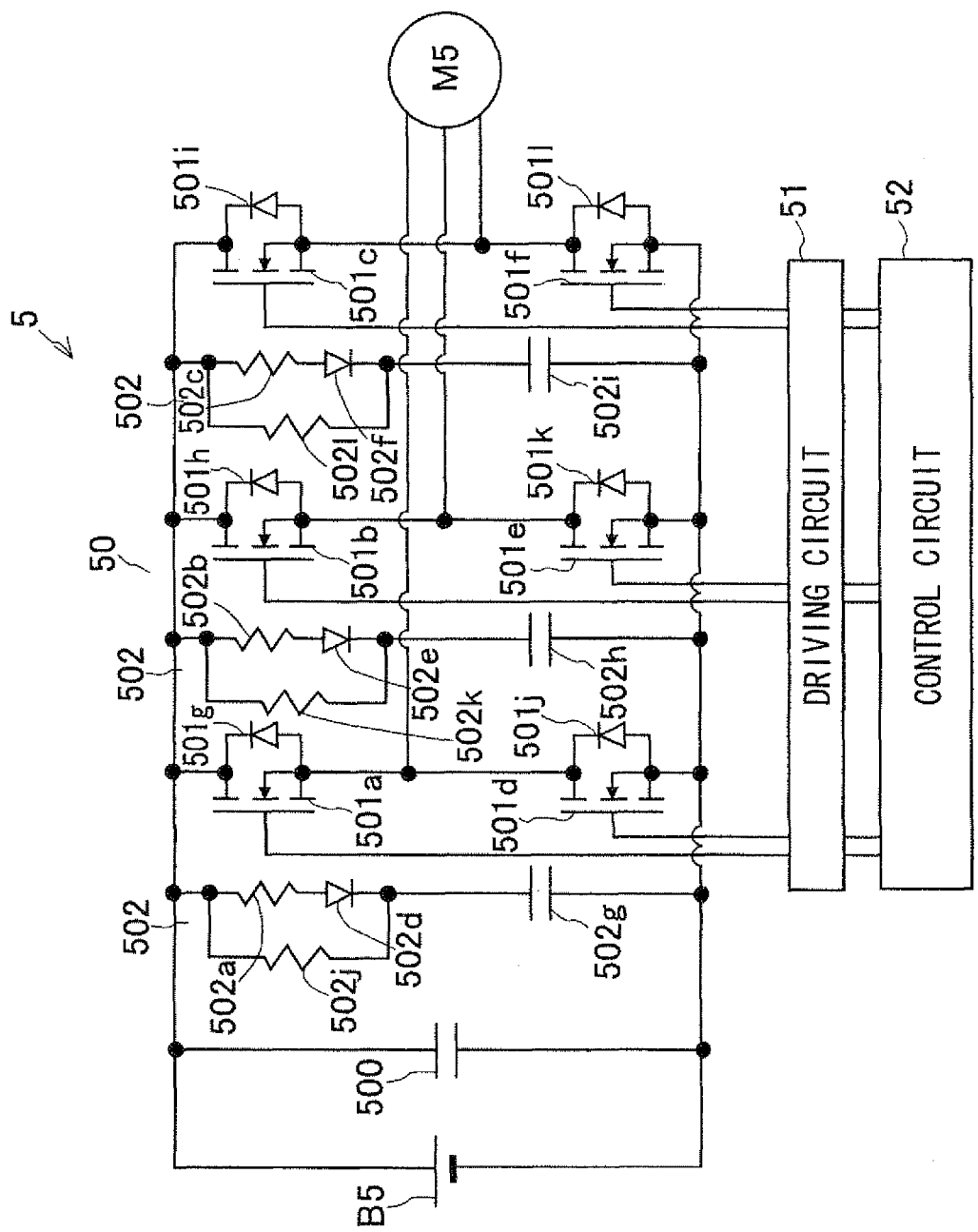
FIG. 15 is a circuit diagram showing a motor control device according to a fifth embodiment of the present invention.
Figure 17:
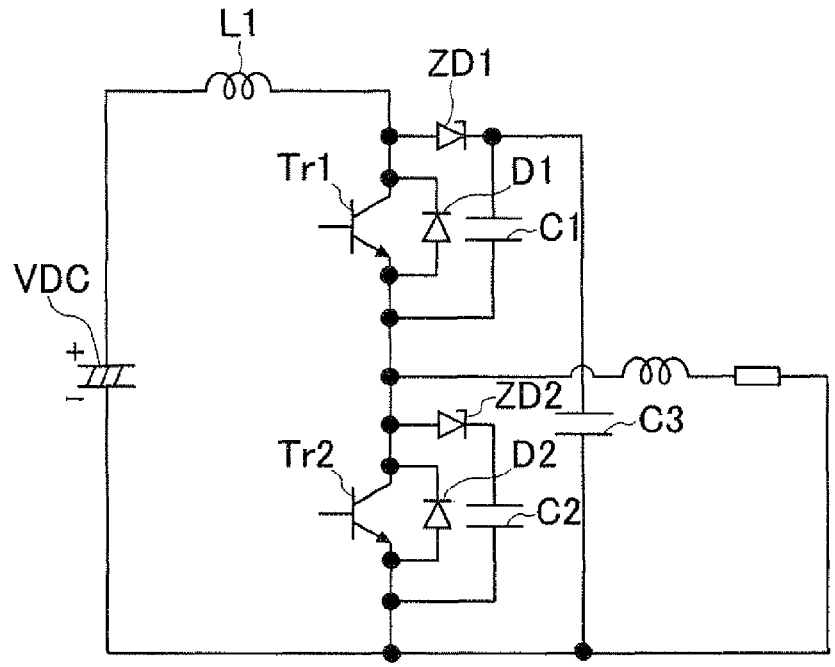
FIG. 17 is a circuit diagram showing a power converter according to an example of the prior art.
Figure 18:
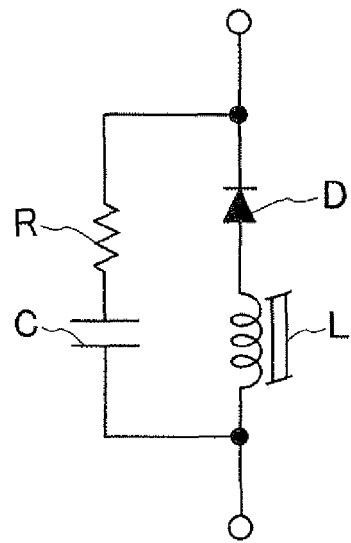
FIG. 18 is a circuit diagram for restricting a recovery current according to another example of the prior art.

As shown in FIG. 15, the motor control device 5 includes an inverter circuit 50, a driving circuit 51, and a control circuit 52. The inverter circuit 50 can operate as a switching device. The driving circuit 51 and the control circuit 52 have configurations similar to the configurations of the driving circuit 11 and the control circuit 12 according to the first embodiment. The inverter circuit 50 is coupled with a battery B5 and a three-phase AC motor M5.

The inverter circuit 50 includes a smoothing capacitor 500, FETs 501a-501f, and a snubber circuit 502. The FETs 501a-501f can operate as semiconductor switching elements. The smoothing capacitor 500 has a configuration similar to the smoothing capacitor 100 according to the first embodiment. The FETs 501a-501f have configurations similar to the FETs 101a-101f according to the first embodiment. The FETs 501a-501f include free wheel diodes 501g-501l, respectively.

The snubber circuit 502 includes resistors 502a-502c (first resistors), diodes 502d-502f (rectifying elements), capacitors 502g-502i, and resistors 502j-502l (second resistors). The resistors 502a-502c are internal resistors of the diodes 502d-502f, respectively. Each of the diodes 502d-502f is a silicon carbide schottky barrier diode or a silicon carbide junction barrier schottky diode. The resistor 502a, the diode 502d, and the capacitor 502g are coupled in series. The resistor 502b, the diode 502e, and the capacitor 502h are coupled in series. The resistor 502c, the diode 502f, and the capacitor 502i are coupled in series. The resistor 502j is coupled in parallel with the resistor 502a and the diode 502d which are coupled in series. The resistor 502k is coupled in parallel with the resistor 502b and the diode 502e which are coupled in series. The resistor 502l is coupled in parallel with the resistor 502c and the diode 502f which are coupled in series.

The snubber circuit 502 including the resistor 502a, the diode 502d, the capacitor 502g, and the resistor 502j is coupled in parallel with the FETs 501a and 501d which are coupled in series. As shown in FIG. 16, the resistor 502a is coupled at a connecting point a51 and the capacitor 502g is coupled at a connecting point a52. An inductance Lr51 of a channel r51 (first channel) provided from the connecting point a51 and the connecting point a52 through the smoothing capacitor 500 is 10 times as large as an inductance Lr42 of a channel r52 (second channel) including the transistors 501a and 502d which are coupled in series and the snubber circuit 502 which includes the resistor 502a, the diode 502d, the capacitor 502g, and the resistor 502j.

As shown in FIG. 15, the snubber circuit 502 including the resistor 502b, the diode 502e, the capacitor 502h, and the resistor 502k is coupled in parallel with the FETs 501b and 501e which are coupled in series. An inductance of a channel (first channel) provided from a connecting point of the resistor 502b to a connecting point of the capacitor 502h through the smoothing capacitor 500 is 10 times as large as an inductance of a channel (second channel) including the FETs 501b and 501e which are coupled in series and the snubber circuit 502 which includes the resistor 502b, the diode 502e, the capacitor 502h, and the resistor 502k.

The snubber circuit 502 including the resistor 502c, the diode 502f, the capacitor 502i, and the resistor 502l is coupled in parallel with the FETs 501c and 501f which are coupled in series. An inductance of a channel (first channel) provided from a connecting point of the resistor 502c to a connecting point of the capacitor 502i through the smoothing capacitor 500 is 10 times as large as an inductance of a channel (second channel) including the FETs 501c and 501f which are coupled in series and the snubber circuit 502 which includes the resistor 502c, the diode 502f, the capacitor 502i, and the resistor 502l.

Because an operation of the motor control device 5 is similar to the operation of the motor control device 1 according to the first embodiment, a description of the operation of the motor control device 5 will be omitted.

In the motor control device 5 according to the present embodiment, effects similar to the motor control device 3 according to the third embodiment can be achieved. In addition, the motor control device 5 according to the present embodiment can be used even when a resonance of the direct current voltage causes a problem.

In the present embodiment, the resistors 502a-502c are the internal resistors of the diodes 502d-502f, respectively. Thus, the configuration of the motor control device 5 can be simplified.

What is claimed is:

1. A switching device comprising:
    a plurality of semiconductor switching elements coupled in series, each of the plurality of semiconductor switching elements including a free wheel diode;
    a smoothing capacitor coupled in parallel with a direct current power source and the plurality of semiconductor switching elements, the smoothing capacitor smoothing an output of the direct current power source and supplying the smoothed output to the plurality of semiconductor switching elements; and
    a snubber circuit coupled between a first connecting point and a second connecting point in parallel with the plurality of semiconductor switching elements,
    wherein an inductance of a first channel provided from the first connecting point to the second connecting point through the smoothing capacitor is equal to or more than 10 times as large as an inductance of a second channel including the plurality of semiconductor switching elements and the snubber circuit so as to reduce a power dissipation associated with a recovery current of the free wheel diode.

2. The switching device according to claim 1, wherein
    the inductance of the first channel includes stray inductances of the smoothing capacitor and wirings in the first channel, and
    the inductance of the second channel includes stray inductances of the plurality of semiconductor switching elements, the snubber circuit, and wirings in the second channel.

3. The switching device according to claim 1, further comprising a coil dispose in the first channel, wherein
    the inductance of the first channel includes stray inductances of the smoothing capacitor and wirings in the first channel and an inductance of the coil, and the inductance of the second channel includes stray inductances of the plurality of semiconductor switching elements, the snubber circuit, and wirings in the second channel.

4. The switching device according to claim 1, wherein the snubber circuit includes a capacitor or a capacitor and a resistor coupled in series.

5. The switching device according to claim 1, wherein the snubber circuit includes
a rectifying element and a capacitor coupled in series, and
a resistor coupled in parallel with the rectifying element.

6. The switching device according to claim 1, wherein the snubber circuit includes
a first resistor, a rectifying element, and a capacitor coupled in series, and
a second resistor coupled in parallel with the rectifying element.

7. The switching device according to claim 1, wherein the snubber circuit includes
a first resistor, a rectifying element, and a capacitor coupled in series, and
a second resistor coupled in parallel with the first resistor and the rectifying element coupled in series.

8. The switching device according to claim 7, wherein the first resistor is an internal resistor of the rectifying element.

9. The switching device according to claim 5, wherein the rectifying element includes a diode.

10. The switching device according to claim 9, wherein the rectifying element includes a silicon carbide schottky barrier diode.

11. The switching device according to claim 9, wherein the rectifying element includes a silicon carbide junction barrier schottky diode.

12. The switching device according to claim 1, wherein the inductance of the second channel is equal to or less than 10 nH.

13. A power converter comprising the switching device according to claim 1, wherein the switching device is configured to convert a power from the direct current power source.

* * * * *